April 22, 1952 R. O. SOFFEL 2,594,087

RADIO RECEIVER SELECTION SYSTEM

Filed May 20, 1949 4 Sheets-Sheet 1

INVENTOR
R.O. SOFFEL
BY
Robert J. Pluskey
ATTORNEY

INVENTOR
R.O. SOFFEL
BY
Robert J. Bluskey
ATTORNEY

April 22, 1952 R. O. SOFFEL 2,594,087

RADIO RECEIVER SELECTION SYSTEM

Filed May 20, 1949 4 Sheets-Sheet 3

INVENTOR
R. O. SOFFEL
BY
Robert J. Pluskey
ATTORNEY

April 22, 1952 R. O. SOFFEL 2,594,087

RADIO RECEIVER SELECTION SYSTEM

Filed May 20, 1949 4 Sheets-Sheet 4

INVENTOR
R.O. SOFFEL
BY Robert J. Pluskey
ATTORNEY

Patented Apr. 22, 1952

2,594,087

UNITED STATES PATENT OFFICE 2,594,087

RADIO RECEIVER SELECTION SYSTEM

Robert O. Soffel, Hastings-on-Hudson, N. Y., assignor to Bell Telephone Laboratories, Incorporated, New York, N. Y., a corporation of New York Application May 20, 1949, Serial No. 94,313

12 Claims. (Cl. 250—20)

This invention relates to electric signaling systems, and more particularly to a method and means for selecting the output of only the best one of several transmission paths or receivers of the same signal wave.

Radio frequency message signal waves are subject to fading and to interference effects, either or both of which may arise, or occur, in an unpredictable manner. To combat this situation, a number of differently situated receiving units have been employed to receive a single message at the same radio frequency. The outputs of these receivers have, in prior practice, been combined to produce a single signal output that at all times contains the loudest, or strongest, received signal; or, only the most desirable output or outputs have been selected and the remaining outputs have been discarded.

Although the direct combining method has been used with some success, it has been found to be not entirely satisfactory since the received radio frequency energy does not always have the same relative phase at all locations, and therefore the audio frequency signal outputs are subject to considerable phase fluctuations. These fluctuations make the direct combination of such energy undesirable, since they may subtract in phase opposition as readily as they may add in phase addition. Then, too, if all outputs are directly combined, the undesirable noise energies in the least desirable outputs are added to, and impair, the desirable signal energies in the most desirable and more relatively noise-free circuits.

The selection of the most desirable, or meritorious, output to the exclusion of all others has also been tried with a fair amount of success. In such systems, the circuit merit has usually been judged by the strength of the received radio frequency, or carrier signal, as evidenced by the automatic volume control voltage, or as determined in a separate detection process; or, has been indicated by the ratio of the signal energy to the noise energy in the respective output circuits. Experience with such systems has indicated that when they are confronted with a choice of two or more channels or circuits of substantially the same merit, they often fail to choose their channel, or attempt to choose more than one channel. It has also been found that the switching process incident to the change from one circuit output to another may generate electric transients of sufficient magnitude and of such characteristics as to induce false operation of the selection mechanism.

Regardless of the manner in which the circuit merit is determined, or expressed, and regardless of the particular type of selection system that is employed, it is desirable that the selection be reviewable as circuit conditions change so that, as the selected circuit output deteriorates in quality, or as it is surpassed in quality by that of another of the group of outputs, the selection process may be reperformed to choose the then best available circuit.

It is, accordingly, an object of this invention to improve the method and means of selecting the best of several communication paths or receivers of the same signal wave by preventing the choice of more than one path or receiver at a time.

It is also an object of the invention to overcome the defects of the above-mentioned systems by making possible the choice of one, and only one, receiver of signal waves at any instant, while at the same time preventing false switching operations that may arise from electric transients produced in the switching operation.

It is a further object of this invention to make possible the selection and reselection of the best of a plurality of receivers of the same signal waves in a manner that does not permit the signal path to be interrupted during the selection process.

It is a feature of this invention that the final selection of the most desirable receiver follows from an elimination process in which the several receivers are initially grouped in pairs, and the better one of each pair is selected. These initially selected receivers are further regrouped and reselected until a final choice is made between the most desirable and the second best receivers.

It is also a feature of the invention that after the most desirable, or meritorious, receiver has been selected, the grouping and selection process is continuously repeated to at all times determine the next best, or second best, receiver, which is in turn continuously compared in a final selection with the most desirable receiver. This continuous determination of the second best receiver is carried out in a manner that does not interfere with the operation of the finally selected receiver.

It is also an important feature of this invention that whenever any comparison indicates that a change should be made in the selection of any receiver, whether it be in an initial, an intermediate or final grouping, the remainder of the selection system is held in its then existing condition until the indicated change or switching operation has been completed. This procedure eliminates unwanted changes that are caused by switching transients.

These and other desirable advantages of the invention will become apparent from the following detailed description of one of its embodiments, when considered in conjunction with the accompanying drawing, in which.

Figures 1, 5:
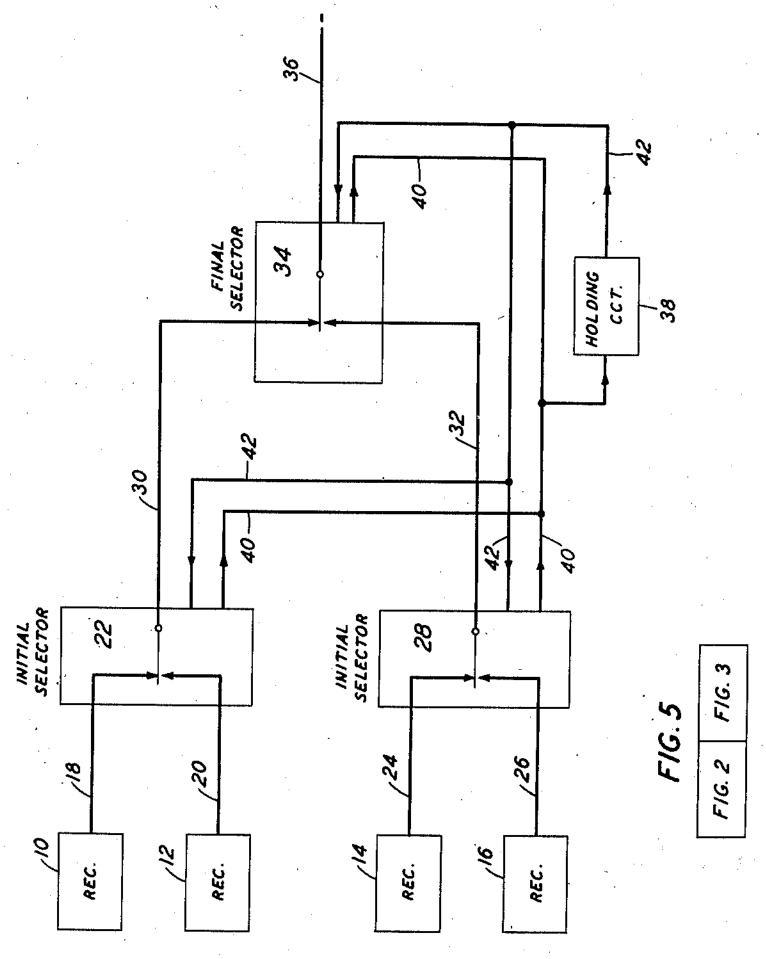
Fig. 1 is a functional diagrammatic illustration of a selection system in accordance with the invention.
Figure 2:
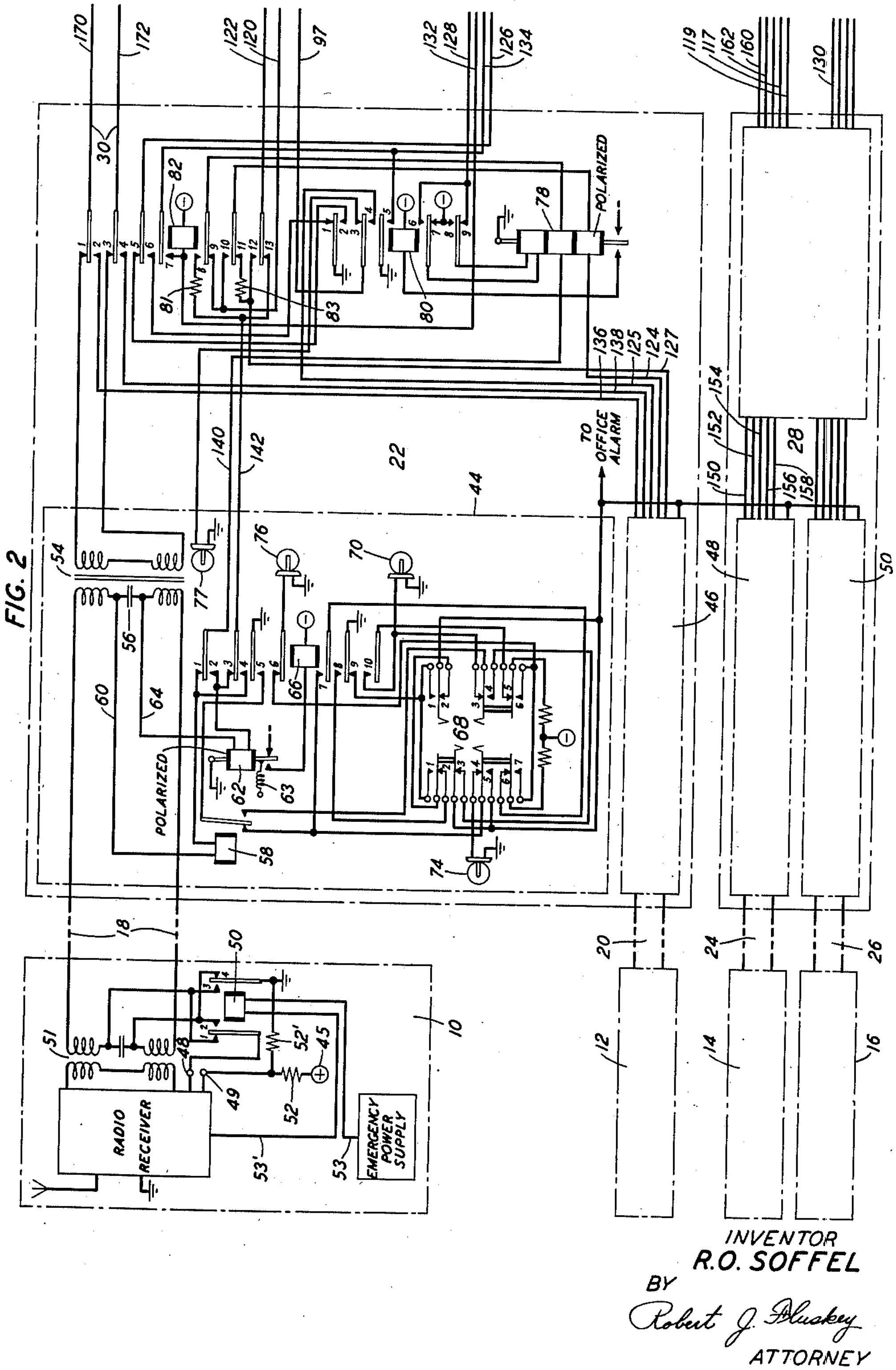
Fig. 2 is a combined functional and schematic diagram of the initial selector branches or circuits of a selection system in accordance with the invention.
Figure 3:
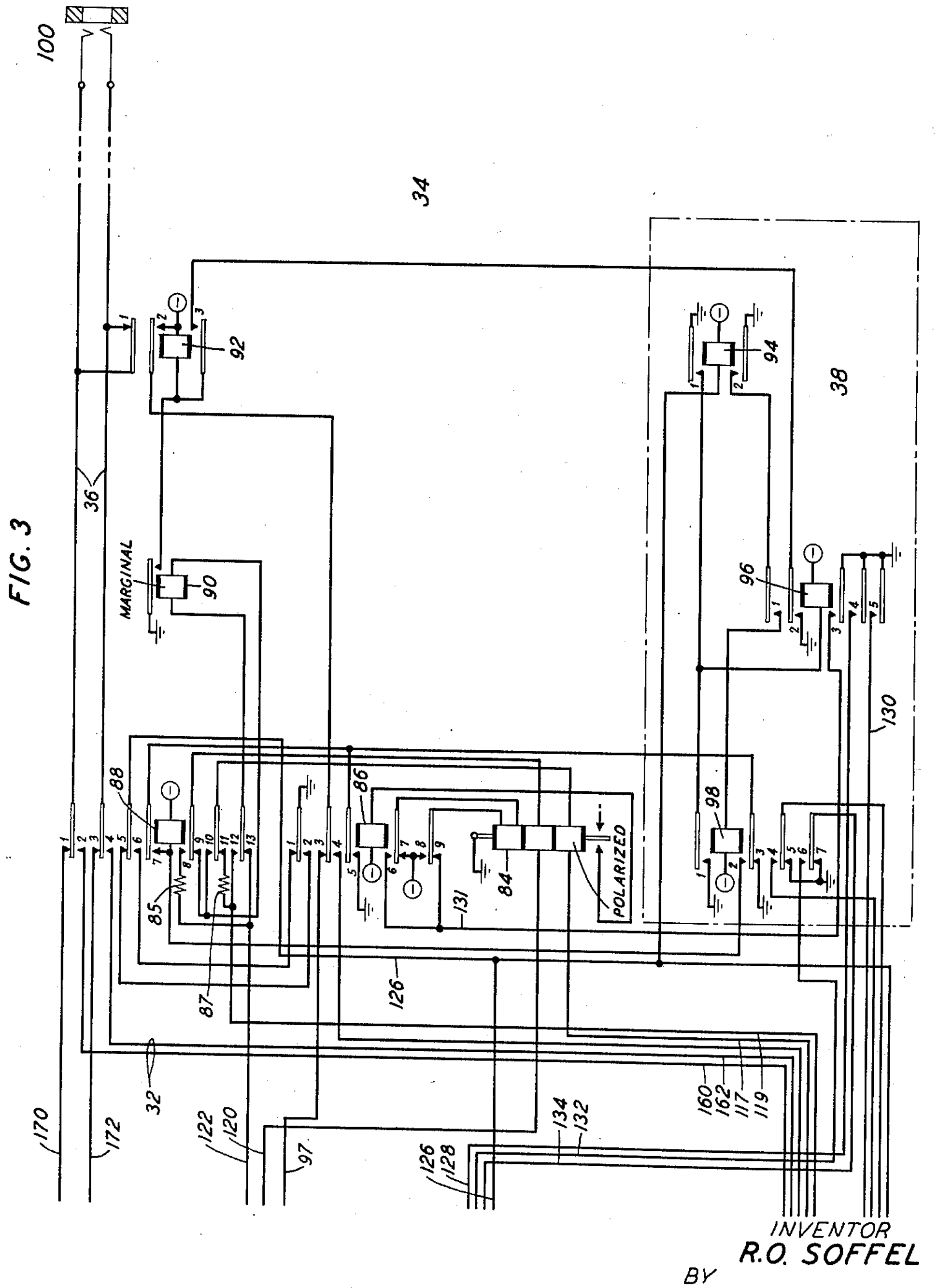
Fig. 3 is a schematic diagram of the final selection branch or circuit of such a system.
Figure 4:
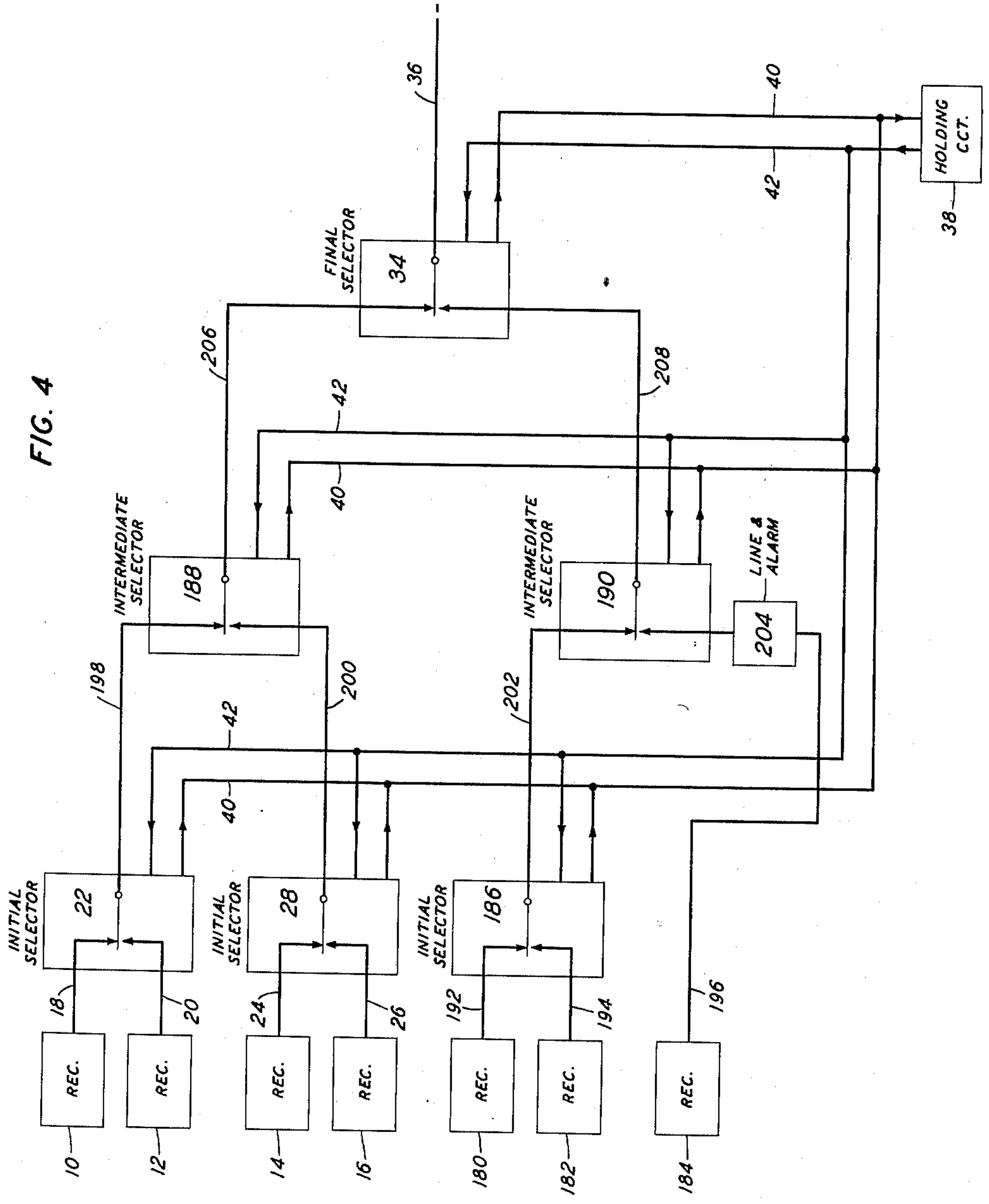

Fig. 4 is a functional diagrammatic illustration of a selection system in accordance with this invention, in which selector units intermediate the initial and final selector units are included, and in which an odd number of receiver stations are involved; and Fig. 5 illustrates how Fig. 2 and Fig. 3 may be arranged to constitute a complete alarm and selection system for choosing the best of, by way of example, four signal receivers of the same signal wave.

In accordance with the invention, a selection system such as is functionally indicated in Fig. 1 may be arranged to choose between the outputs of a number of geographically separated receiver stations 10, 12, 14, 16 which receive the same signal wave. Each receiver station includes a radio receiver, and in this general description, as well as in the detailed description which will follow, it will be assumed that each receiver is arranged to produce a unidirectional voltage the magnitude of which is directly related to the merit, or goodness, of its respective signal output. As was previously stated, this merit indicating voltage may be indicative of the strength of the received carrier wave, it may reflect the ratio of the signal and noise energies in the respective receiver output, or it may utilize any other suitable factor for portraying the relative quality of the circuit branch. These voltages, together with the message signal voltages, are transmitted over connecting circuits 18 and 20 to initial selector 22, and over circuits 24 and 26 to the initial selector 28. For purposes of this general explanation, all of the connecting circuits in Fig. 1 are shown as single lines. As will later appear in the detailed description of Figs. 2 and 3, these connections may actually comprise one or more single or paired conductors.

Each selector 22, 28 is arranged such that it continuously compares the merit indicating voltages of its associated radio receivers, and selects both the message signal output and the associated merit indicating voltage that is adjudged to be the better. These selected outputs are then transmitted over connecting circuits 30, 32 to the final selector 34, where the previously selected merit indications are again compared and the signal output that is associated with the better of these two is then selected and is communicated over connecting circuit 36 to the ultimate point of utilization.

Simultaneously, with a decision by either the final selector 34, or one of the initial selectors 22, 28 that a change from one to another receiver is required, and before the switching operation is actually started, the holding circuit 38 is actuated by a signal which it receives over circuit 40 from the respective selector unit. Holding circuit 38 then transmits over circuit 42 a signal that holds the comparison branch of each selector unit in its existing condition. After this holding condition has been established, the holding circuit 38 also signals the respective selector unit to proceed with its switching change. After the switching change from one to another receiver is completed, the respective switching selector unit removes the signal that has actuated holding circuit 38, thereby restoring this circuit to its original condition, which action in turn releases the comparison branches of the various selector units for further comparison purposes. For purposes of simplicity in this general explanation, the connecting circuit 42 of Fig. 1 is indicated as serving as the transmission path for both the holding signal to the comparison branch of each selector and for the enabling signal to the switching branch of the switching selector.

Although in the foregoing functional description the receiver selection system is described as being arranged to choose one of four receiver outputs, it should be appreciated that selection systems in accordance with this invention are not limited to this number of receivers. Selection systems to accommodate any desired number of receivers may be arranged through the use of additional selector units in a further extension of the binary comparison arrangement. Thus, if eight receivers are to be accommodated, the receiver selection system will include two selector units intermediate four initial selector units and one final selector unit. The exact number of initial and intermediate selector units that will be required in any given instance will, of course, depend upon the number of receivers in the receiver system. When the selecting devices are suitably arranged in accordance with the invention each receiver output is, in effect, compared to that of every other receiver output, until it only remains for the final selector 34 to choose between the two receivers that have been judged to be the most desirable.

In addition to the selection, lock-up and switching features of the previously described selection system, there are also provided a number of alarm features which will be discussed in connection with the detailed showing of Figs. 2 and 3 to which reference is now made. These figures, when arranged with Fig. 2 on the left, illustrate in detail only so much of an entire selection system, such as was functionally described in connection with Fig. 1, as is required for a complete understanding of the present invention. Duplicate units are functionally indicated in block diagram. In accordance with this arrangement, only so much of the details of receiver station 10, initial selector 22 and final selector 34 as are required for a complete understanding of the invention will be described. Thus, only one initial selector 22 with one of its included line and alarm units 44, 46 will be described. The other line and alarm unit 46 of selector 22, and the other selector 28 together with its included line and alarm units 48, 50 are diagrammatically indicated.

Receiver stations 10, 12, 14, 16 generally are, though they are not required to be, geographically separated from the location of their associated initial and final selector units 22, 28, 34. Generally, although this need not necessarily be the case, the initial and final selector units, and any intermediate selector units that might be included in the system, are grouped together at one location, which may and generally is geographically separated from the location at which the message signals are utilmately utilized. Since the message frequencies are at audible frequencies, they may be transmitted to their point of final utilization in any conventional manner after they have been selected in the manner to be described. As will later appear in connection with the description of the alarm features of the described selection system, it is contemplated that a supervisory attendant will probably be present at the location of the selector units. Again, although the described system was designed to fit this situation, such attendance is not a necessary precedent for the successful comparison and selection of the radio receivers.

Receiver station 10 includes a conventional radio receiver complete with its usual, or normal, power supply apparatus. It also includes an emergency power supply which may be connected in any suitable manner (not shown) to conductors 53, 53' and the serially connected winding of relay 50, to supply power to the radio receiver whenever the normal receiver power supply fails. The exact arrangement that is used for controlling the connection of the emergency power supply to the radio receiver is of no concern in this invention. For the purposes of this disclosure, it will be understood that the emergency power supply is only connected during failure periods of the receiver's normal power supply, and the winding of relay 50 is energized each time the emergency supply is so connected. The radio receiver is arranged in any suitable fashion to produce across its terminals 48, 49 a unidirectional voltage the magnitude of which is a measure, in accordance with a predetermined standard, of the relative desirability of its message signal output, which is transmitted through output coil 51. Voltage dividing resistors 52, 52' and potential source 45 are so chosen that they supply to receiver terminal 49 a voltage of proper polarity for addition to any merit indicating signal produced by the radio receiver, and of sufficient magnitude to maintain the alarm relays in the initial selector 22 in a reference condition as will presently be explained. The left and right armatures of relay 50 are respectively connected to terminal 48 and the negative terminal of source 45. Relay contacts 1, 3 and 2, 4 are paired and respectively connected to the upper and lower conductors of conductor pair 18 over which both the message signal voltages and the combined unidirectional voltages are transmitted to initial selector 22.

Initial selector 22 includes a pair of line and alarm units 44, 46 in addition to its comparison and switching apparatus. Unit 44 includes a line repeating coil 54 with its upper and lower primary windings connected through the direct-current blocking capacitor 56. The secondary winding of coil 54 is connected to contacts 1 and 3 of initial switching relay 82. Contacts 2 and 4 of this relay are connected over conductor pair 136, 138 to the secondary winding of an identical line coil in line and alarm unit 46 associated with receiver station 12. The upper primary winding of coil 54 is connected to the winding of relay 58 over conductor 60. The lower primary winding of this coil is connected to the winding of polar relay 62 over conductor 64. Relay 66 provides means for maintaining the correct polarity of connections to the initial comparison relay 78 when the emergency power supply at receiver 10 is brought into use. Power alarm lamps 70, 74, 76 are actuated through the contacts of alarm key 68 in a manner which will presently be described. Because of the substantial similarity between the comparison and switching branches of the initial selector 22 (Fig. 2) and the final selector 34 (Fig. 3) these portions of these units will be described together.

Initial comparison relay 78 and final comparison relay 84 are each polar relays, and each has three separate windings. The center and lower windings of each of these relays 78, 84 are connected such that their magnetic forces are opposed. The center winding of relay 78 is included in the circuit of the unidirectional signal from receiving station 10. The lower winding of relay 78 is similarly associated with receiving station 12. Thus, if the control, or merit indicating, voltage from receiver 10 exceeds that from receiver 12, the current through the center winding exceeds that through the lower winding of relay 78 and the latter's armature moves to its right contact. Conversely, if the voltage from receiver 12 exceeds that of receiver 10, the armature of relay 78 is moved to its left contact. In similar fashion the center and lower windings of the final comparison relay 84 are connected respectively in the unidirectional signal circuits of the initial selectors 22, 28 in such manner that the magnetizing force of the current in the center winding, caused by the current from initial selector 22, is opposed by the magnetizing force of the current from selector 28 in the lower winding. Each polar relay 78, 84 has a third, or upper, winding which is reversibly connected to battery through contacts 7 or 8 of its auxiliary comparison relay 80, 86, respectively. These windings are connected to the holding branch 38 of the final selector 34 and they function to lock up, or hold, the respective relay in its then present position whenever a new selection has been made and a switching operation is imminent.

The winding of each auxiliary comparison relay 80, 86 is connected to the left contact of its respective comparison relay 78, 84. The winding of each switching relay 82, 88 is connected to a contact of the enabling relay 98 in the holding circuit branch 38 in such manner that the switching relay 82 or 88 may not change from its non-operated to its operated position unless enabling relay 98 is also operated.

Artificial, or dummy, load resistors 81, 83 may, but need not, be of equal value and are connected to contacts 8 and 11 respectively of initial switching relay 82. The exact value of these resistors is an optional matter. It may be equal to the combined resistance of a lower or center winding of the final comparison relay 84 and the winding of relay 90, or it may be greater or less than this value by any desired amount. In either case the resistors are alternately switched into the signal circuit of receiver station 10 or 12 to compensate for the resistance of these relay windings when the latter are not included in one or the other of these circuits. Artificial, or dummy, load resistors 85, 87 also may, but need not, be of equal value, and are connected to contacts 8 and 11 of final switching relay 88. The exact value of these resistors is also an optional matter. This value may be greater or less than the resistance of the winding of relay 90, by an optional amount. These resistors are alternately switched into the unidirectional signal circuit from initial selector 22 or 28 to compensate for the resistance of this relay winding when it is not included in one of these circuits. Increasing the value of these resistors in excess of the resistance value of the relay windings that they replace, imparts a greater bias in favor of the selected receiver than would otherwise exist.

The selector 34 of Fig. 3 consists of a comparison and switching circuit branch, a threshold circuit branch and a holding circuit branch. This latter circuit branch was functionally indicated in Fig. 1 as a separate unit 38.

The comparison and switching circuit branch includes the three-winding polar comparison relay 84, the auxiliary comparison relay 86, and switching relay 88 to which reference has been made. The threshold branch includes marginal relay 90 and its associated shorting relay 92. Ground is applied to the winding of relay 92 over the contact of marginal relay 90. Relay 90 is always included in the unidirectional signal circuit from one of the receiver stations 10, 12, 14, 16, and requires for its operation the combination of the steady voltage from the voltage divider 52, 52′ at one of the stations plus some predetermined minimum value of merit indicating voltage that is equivalent to a message signal output that is considered to be of commercial quality. The holding circuit branch includes hold relay 94, hold selector relay 96 and enabling relay 98. The winding of hold relay 94 is connected to an armature of each switching relay 82 in the initial selectors 22, 28 and in the final selector 34. The winding of hold selector relay 96 is connected to contact 1 of relay 94, and the winding of enabling relay 98 is connected to contact 1 of relay 96. The manner in which all of the previously mentioned units are interconnected to perform their stated functions, and the sequence of operations attendant upon the proper functioning of these units may be best understood from a detailed description of the operation of this receiver selection system when a given set of circumstances are assumed.

For the purpose of the following description let it be assumed that each radio receiver is being supplied power from its normal power supply, and that the message signal output from any one does not equal or exceed the predetermined level or value that has been designated as the minimum acceptable quantity. Under these circumstances, each relay will be in the operated or non-operated condition shown in Figs. 2 and 3.

Polarity reversing relay 50 at receiver station 10 is unoperated, and positive potential from the voltage divider 52, 52′ plus the merit indicating signal, if any, is connected over contact 1 of relay 50 to the upper conductor of conductor pair 18. The return signal path to ground is over the lower conductor of pair 18 and contact 4 of relay 50. The received message signal output is transmitted through output transformer, or repeating coil 51, over conductor pair 18, through line repeating coil 54 and over contacts 1 and 3 of switching relays 82, 88 to the output circuit 36, which is shorted through the armature and contact 1 of relay 92. Blocking capacitor 56 in line and alarm unit 44 diverts the unidirectional merit indicating voltage from receiver station 10 to the windings of relays 58 and 62 over conductors 60, 64, respectively. Relay 58 is operated and its armature rests against its left contact. Polar relay 62 is energized to overcome the pull of biasing spring 63, and its armature rests against its right contact, to which no connection is made. Reversing relay 66 is unoperated, and no alarm lamp 70, 74, 76 is lighted. Since the receiver's message output is assumed to be not in excess of minimum requirements, the signal indicating lamp 77 is not lighted, and neither the marginal relay 90 nor the shorting relay 92 in final selector 34 is operated. This latter condition places a short circuit across output circuit 36.

The direct-current signal circuit for the merit indicating signal from receiver station 10 includes source 45, voltage divider 52, 52′, terminals 48, 49, contact 1 of relay 50, the upper conductor of pair 18, conductor 60 and the winding of relay 58, contact 1 of relay 66, the center winding of polar relay 78, contact 9 of initial switching relay 82, interconnecting conductor 120 and the center winding of final polar comparison relay 84, contact 9 of final switching relay 88, the winding of marginal relay 90, contact 13 of final switching relay 88, interconnecting conductor 122 and contact 13 of initial switching relay 82, contact 3 of reversing relay 66, the winding of polar relay 62, conductor 64, the lower conductor of pair 18, contact 4 of relay 50 to ground. The lower winding of initial comparison relay 78 is connected in a similar direct-current signal circuit for the merit indicating signal from receiver station 12, which circuit includes conductors 124, 127. In this latter case it will be noted that the signal circuit does not include the windings of the final comparison relay 84 and the marginal relay 90, but instead includes the dummy-load resistor 83, which is here assumed to be of value equal to the combined resistance of these relay windings. The resistances of these two direct-current signal circuits are equal. The lower winding of final comparison relay 84 is included in the direct-current signal circuit of initial selector 28, over conductors 117, 119. It will be noted that under the assumed set of circumstances this signal path does not include the winding of marginal relay 90 but does include the load resistor 87, the resistance of which is assumed to be equal to resistance of the winding of relay 90. The windings of polar relays 62, 78, 84 are so connected that these relays assume their indicated positions with the armature of relay 62 resting on its right contact and the armatures of relays 78 and 84 resting in their mid-position, since the magnetizing effect of the current in each of the center and lower windings is nullified. Relays 80, 82, 86 and 88 are unoperated. Relay 90 is a marginal relay that requires for its operation a current flow that is equivalent to a message signal output that is equal to a predetermined minimum commercial standard. Relay 92 is unoperated and the output circuit 36 is shorted through its contact 1. All of the holding branch relays 94, 96, 98 are unoperated.

If it is now assumed that the message signal output from receiver station 10 improves to a degree where it exceeds the predetermined minimum commercial standard, its merit indicating signal voltage correspondingly increases and the magnetizing force of its current in the center windings of relays 78 and 84 causes the armatures of these relays to move to their right contacts. Since both of these contacts are unused these armature changes produce no effect. The current flowing in the winding of marginal relay 90 is increased to its "operate" value, and relay 90 operates to connect ground through its contact to the winding of shorting relay 92, to complete battery circuit through the winding of relay 92, operating this relay. Operation of relay 92 breaks the connection between its upper armature and contact 1 which has shorted the output circuit 36, and the message signal output is made available to utilization circuit 100. An energizing circuit for lamp 77 is completed from battery, through contact 2 of relay 92, contact 3 of auxiliary comparison relay 86, interconnecting conductor 97 to and through contact 3 of the auxiliary comparison relay 80, lamp 77, to ground, to light signal indicating lamp 77 in line and alarm unit 44 Lighted lamp 77 indicates to an observer or attendant that the radio receiver at station 10 is being utilized as the source of the message signal being transmitted to utilization circuit 100. This condition will maintain so long as the signal output from this receiver exceeds the predetermined minimum value, and also exceeds the signal output of any of the other receivers.

If now the message signal output from receiver station 12 exceeds that from receiver station 10, the merit indicating signal from station 12 will exceed that from station 10, and the unidirectional current in conductors 124, 127 and in the lower winding of initial comparison relay 78 exceeds that from receiver station 10 in the center winding of this relay, and the armature of this relay moves from its right to its left contact. This action connects ground to the winding of auxiliary comparison relay 80, and operates this relay. Operated relay 80 connects ground over its contact 2, contact 5 of unoperated switching relay 82 and interconnecting conductor 126 to the winding of hold relay 94 to operate this relay in the holding branch circuit 38 of final selector 34. Hold relay 94 connects ground over its contact 1 to hold selector relay 96, causing this latter relay to operate. Operation of relay 96 completes a circuit over its contact 1 for ground from contact 2 of relay 94 to cause the operation of enabling relay 98. The operation of hold selector relay 96 also connects ground over its contacts 3, 4 and 5 to conductors 131, 128 and 130, respectively. Closure of contact 4 of relay 96 completes a circuit from ground, conductor 128, contact 6 of operated auxiliary comparison relay 80 in the initial selector 22, through the upper winding of initial comparison relay 78 to battery through contact 8 of relay 80. This winding of relay 78 is arranged such that when so connected its effect is additive to the existing unbalance in this relay, and the armature of relay 78 is held against its left contact with a force that is beyond the capabilities of an opposed merit indicating signal to counteract. At this same time, connection of ground over contact 5 of relay 96 to conductor 130 completes a circuit to cause the initial comparison relay in initial selector 28 to similarly lock up in its then present position. Closure of contact 3 of relay 96 completes a circuit from ground, conductor 131, contact 9 of relay 86, the upper winding of relay 84 to battery through contact 7 of relay 86, to lock the armature of relay 84 on its right contact with such force that the merit indicating signal in its lower winding cannot cause this relay to move to its other contact. At this time, therefore, the initial and final comparison relays 78, 84 are locked on their left and right contacts, respectively. Initial auxiliary comparison relay 80 is held operated through the armature of relay 78. Final auxiliary comparison relay 86 is unoperated, since the circuit of its winding is open at the left contact of final comparison relay 84; and the circuit of the winding of final switching relay 88 is also open at contact 5 of relay 86. This condition leaves only the initial switching relay 82 which may be operated if ground is provided for the battery connected to one terminal of its armature winding. This ground is made available over contact 6 of the last-to-operate enabling relay 98, conductors 132, 134 and contact 5 of relay 80. Operation of relay 82 connects its winding to ground over its own contact 7 and contact 5 of relay 80. The message signal output from receiving station 12 is thus connected over conductor pair 20, line unit 46, conductors 136, 138 and contacts 2 and 4 of switching relay 82 to interconnecting conductor pair 30 and the final selector 34. This change shifts the output circuit 36 from the output of receiver station 10 to that of receiver station 12. In addition to the foregoing, the operation of relay 82 changes the paths of the merit indicating control signals by substituting, by closure of contact 8 and opening of contact 13, load resistor 81 for the combined resistances of the center winding of final comparison relay 84 and the winding of marginal relay 90 in the direct-current path for receiver 10; and by similarly changing over contacts 10, 12 of relay 82, the direct-current path associated with receiver 12 to include the windings of these relays in place of the previously included load resistor 83.

When auxiliary comparison relay 80 operated, it transferred the battery connection over contact 2 of relay 92, contact 3 of relay 86 and conductor 97 from its contact 3 and signal indicating lamp 77 of line unit 44, to its contact 4 and conductor 125 to light the corresponding signal indicating lamp for receiver 12 in line unit 46.

Simultaneously with its other switching operations, the initial switching relay 82 opens its contact 5 over which the ground connection has been completed from contact 2 of operated relay 80 to conductor 126 and hold relay 94. This relay 94 now slowly releases, and the ground connection over its contact 1 is broken; but hold selector relay 96 is held operated by the ground connection for its winding over contact 1 of the associated enabling relay 98. Relay 94 in releasing also opens the ground connection over its contact 2, whereby relay 98 releases and opens its contact 1, thereby releasing hold selector relay 96. The ultimate release of relay 96, which occurs sufficiently long after the last switching operation to permit all transients to decay, removes the ground connections over its contacts 3, 4 and 5 to unlock the final comparison relay 84, and the initial comparison relays 78 in the initial selector units 22 and 28. This action restores these circuits to their operative condition for further comparison and switching operations.

Initial switching relay 82 is held operated over a circuit from battery, its winding, its contact 7, conductor 134 and contact 7 of the now unoperated enabling relay 98 to ground. Relay 82 is thus no longer dependent upon the ground connection at contact 5 of the auxiliary comparison relay 80, and this latter relay is now free to follow its associated comparison relay 78 in setting up a new switching operation without causing interruption in the message path over contacts 2 and 4 of switching relay 82.

If receiver 12 continues to surpass receiver 10, but its quality is in turn excelled by that of receiver 14, a new switching operation will be required. The message signal output and merit indicating signal control voltages from receiver 14 are transmitted over conductor pair 24 to its line and alarm circuit 48, where the message output is separated to conductor pair 150, 152. The control signal is transmitted from unit 48 over the direct-current signaling pair 156, 158 to the initial comparison relay in selector unit 28. The armature of this comparison relay is resting on its right contact, and the auxiliary comparison and switching relays are unoperated. Under these conditions, the message signal output of receiver 14 is transmitted to the final selector 34 over conductor pair 160, 162. The path of the associated merit indicating signal includes conductor 117, the lower winding of final comparison relay 84, contact 11 of switching relay 88, dummy-load resistor 87 and conductor 119. As soon as the current through the lower winding of relay 84 exceeds that from selector 22 in the relay's center winding, its armature is moved to its left contact to supply ground to the winding of final auxiliary comparison relay 86. The operation of the final auxiliary comparison relay 86 sets into motion the same sequence of operations that occurred when the initial selector auxiliary comparison relay 80 was operated in the previously described example. A circuit is completed from ground, contact 2 of relay 86, contact 5 of relay 88, conductor 131 through winding of hold relay 94 to battery and ground. Relay 94, in operating, causes hold selector relay 96 to operate. Operation of relay 96 locks up each polar comparison relay in its existing position, and also causes enabling relay 98 to operate. The winding of final switching relay 88 is connected to ground over contact 5 of auxiliary relay 86 and contact 2 of enabling relay 98. Switching relay 88, in operating, transfers output circuit 36 from its connection to conductor pair 170, 172 over contacts 1 and 3 to conductor pair 160, 162 over contacts 2 and 4 of this relay. The operation of final switching relay 88, in opening its contact 5, also removes the ground from the winding of relay 94, with the consequent release of the associated holding relays; and each selection circuit is restored to its operative comparing and switching position in the manner that has been described in connection with the operation of initial switching relay 82.

In the foregoing description it has been assumed that the radio receivers were operating under normal power conditions. The manner in which power irregularities, or interruptions, are disclosed by the line and alarm units 44, 46, etc. may be best understood by a description of the operation of unit 44 associated with receiver 10. This operation will be considered under two conditions, first, when the regular power fails and the emergency power is placed in service, and second, when a complete power failure is experienced.

Under normal power conditions, relay 50 at receiver 10 is unoperated, and the combined alarm and merit indicating voltages cause conductor 60 to be at a positive potential with respect to conductor 64 in line and alarm unit 44. When the emergency power supply is utilized, relay 50 is operated to open its contacts 1 and 4 and close contacts 2 and 3. This action reverses the polarity between conductors 60, 64, and the armature of relay 62 is moved to its left contact to complete an operating circuit from ground for the winding of reversing relay 66. The operation of reversing relay 66 restores the proper polarity between conductors 140, 142 to the comparison and switching branch of initial selector 22 by reversing the connections over its contacts 1 and 3 to new connections over contacts 2 and 4. Thus proper polarity is maintained in the comparison and switching branch of the circuit, but reverse polarity conditions prevail in the line and alarm branch of the circuit. Power failure lamp 74 is short-circuited over a path comprising ground, lamp 74, left contact 4 of key 68, left contact of relay 58, contact 5 of reversing relay 66, to ground. The connection to the normal power lamp 76 is opened at contact 6 of relay 66. Emergency power lamp 70 is lighted by battery supplied over right contact 5 of key 68 and contact 10 of relay 66. Lamp 70 thus indicates that receiver 10 has switched to its emergency power supply, and continues this indication as long as the emergency power is in use at the receiver, or until key 68 is operated to the right to open its normally closed contacts 2, 3 and 5 on that side. The operation of relay 66 provides a ground connection over its contact 8, and the left and right contacts 2 of key (unoperated) 68, to complete a circuit to actuate an alarm system (not shown) common to all of the line and alarm units 44, 46, 48, 50, and which may also serve other types of equipment. Such an alarm system is useful in situations where an attendant is responsible for the proper operation of several items of apparatus, since it provides a ready means for directing attention to the disturbing group of units. This common alarm is also extinguished when right contact 2 of key 68 is opened by the operation of the key to the right.

When normal power conditions are restored at receiver 10, its relay 50 is released, the original polarity is restored to conductors 60, 64, the armature of relay 62 returns to its right contact, and relay 66 is released. The connections over contact 2, 4 of relay 66 are transferred to contacts 1, 3 of this relay to again maintain proper polarity in the comparison and switching branch of the circuit. Normal power lamp 76 is now lighted by battery received over right contact 6 of operated key 68 and contact 6 of the now unoperated reversing relay 66. The common office alarm system is again energized over a circuit completed from ground through contact 9 of relay 66 and right contact 1 of operated key 68. The operation of key 68 to its normal, or center position, removes this ground, and also extinguishes normal power lamp 76 by opening the connection over right contact 6 of key 68. The circuit is thus restored to its original condition.

Power failure alarm lamp 74 is only energized when both the emergency and normal power sources at receiver 10 have failed. Under these circumstances the merit indicating voltage and the voltage contributed by voltage divider 52, 52′ are removed from the control signal circuit. Relays 58 and 62 are deenergized with the result that the armature of relay 58 engages its right contact, and the armature of relay 62 is pulled to its left contact by its biasing spring 63. Reversing relay 66 is again operated, but without affecting the comparison branch since there is now no merit indicating signal from receiver 10. The common office alarm system is energized over a circuit from ground through contact 8 of relay 66 and left and right contacts 2 of unoperated key 68. Power failure lamp 74 is energized by battery received over left contact 6 of key 68, contact 7 of relay 66, and left contact 4 of key 68. The circuit of normal power lamp 76 is opened at relay 66, contact 6, and emergency power lamp 70 is short-circuited over a path from ground, lamp 70, right contact 3 of key 68, right contact of relay 58, contact 5 of relay 66, to ground. The operation of key 68 to its left position opens its left contacts 2, 4 and 6 to extinguish power failure lamp 74, and remove the ground from the common office alarm system. When normal power conditions are restored at receiver 10, the voltage from divider 52, 52′ causes relay 58 to operate and move its armature to its left contact. This voltage also causes relay 62 to move its armature to its right contact, thereby releasing reversing relay 66. Closure of contact 6 of relay 66 completes a circuit from ground, through lamp 76, contact 6 of relay 66, left contact 7 of operated key 68 to battery to light lamp 76 and indicate that the power interruption at receiver 10 has been terminated. The common office alarm is energized over a circuit from ground through contact 9 of relay 66, and left contact 1 and right contact 2, respectively, of key 68. Restoring key 68 to its normal center position extinguishes lamp 76 and removes this ground from the office alarm system.

If receiver 10 is restored to its emergency power supply instead of to its normal power supply, relay 58 moves its armature to its left contact, thereby removing the short circuit across lamp 70, the armature of polar relay 62 remains on its left contact, and relay 66 is held operated. The emergency power lamp 70 is lighted by battery received over right contact 5 of key 68 and contact 10 of relay 66. Ground connection is provided to the common office alarm over contact 5 of relay 66, the left contact of relay 58, contact 5 of the operated left side of key 68. This office alarm is restored to its unoperated condition by operating key 68 to the right to open its right contact 5.

Although the invention has been described as being incorporated in a selection and alarm system, such as is indicated in Fig. 1, for selecting the best one of four receivers of the same message signal, its utilization is not limited to such an arrangement. It should be evident that the selection system of this invention may be expanded to care for any reasonable number of receivers if there is provided an initial selector unit for each pair of receivers, and suitable intermediate comparison and selecting devices are inserted between the several initial selectors and the final selector 34 to carry out the binary comparison procedure.

Such an expanded selecting arrangement is functionally indicated in Fig. 4, wherein a radio receiver of the same message signal wave is located at each of the seven (by way of example) receiver stations 10, 12, 14, 16, 180, 182 and 184. The signal outputs from the receivers at stations 10 and 12 are compared in initial selector 22. The outputs from stations 14 and 16 are compared in initial selector 28, and those from stations 180 and 182 are compared in initial selector 186. The better of each compared pair of signal outputs is then subjected to a further comparison process in the intermediate comparison and selecting units 188, 190. It will be noted that the Fig. 4 arrangement provides one receiver station 184, the signal output of which is not permanently paired with the output of any other station. The receiver output from station 184 is connected over connecting circuit 196 to a line and alarm unit 204. This receiver output might be supplied to an initial selecting unit (not shown) that would be individual to this single station. Since no other output would be paired with that from station 184, this additional selecting unit (not shown) would always select the output from station 184, and its output would be supplied to the intermediate selector 190 in the same manner as is the output from initial selector 186. An optional, and more economical, arrangement is to insert a line and alarm unit 204 between station 184 and the intermediate selector 190 to provide the power supply alarm functions for station 184. This arrangement is shown in Fig. 4 in order to more clearly indicate that the intermediate type of comparison and selecting devices or units need not provide any of the alarm features which are included in the initial selector unit. Line and alarm unit 204 may have substantially the same circuit arrangement as that shown for the line and alarm unit 44 (Fig. 2) which forms a portion of the initial selector 22. It is, of course, understood that each initial selector 22, 28 and 186 contains a pair of similar line and alarm units, which are individual to the respective stations 10, 12, etc. The signal output from station 184 is transmitted from its line and alarm unit 204 to intermediate selector 190, wherein it is compared with the signal output from station 180 or 182, whichever has been selected by initial selector 186 and by it transmitted over connecting circuit 202. Similarly, the receiver outputs that are selected by initial selectors 22 and 28 are connected to the intermediate selector 188 over connecting circuits 198, 200, respectively. The intermediate selectors 188, 190 each act in the same manner as did the initial selectors 22, 28, 186 to compare and select the better of the pair of signal outputs that are supplied to the unit. The signal outputs that are selected by intermediate selectors 188, 190 are connected over connecting circuits 206, 208, respectively, to final selector 34. These signal outputs are compared in final selector 34, and the better of the two is selected and connected to output connecting circuit 36 in the manner that has been previously explained. In this Fig. 4 arrangement the holding circuit 38 is again shown as a separate unit, although in a preferred embodiment of the invention, as described in connection with Figs. 2 and 3, it is included as a portion of the final selector 34. Holding circuit 38 operates, in the manner that has been previously described, to accept, over connecting circuit 40, signals from any one of the comparison and selecting devices that a selecting change should be made, and to supply over connecting circuit 42 a signal that holds the comparison relay in each selecting unit in its then present operated position until the required switching operation has been accomplished. As in the previously described example, the holding circuit 38 restores each selecting unit to its free selection state when the required switching change has been completed. This restoring signal is functionally indicated as being transmitted over connecting circuit 42.

The intermediate comparison and selecting devices or units 188, 190 need not include any of the alarm features of the initial type of selector unit 22, 28, 186, nor any of the holding or enabling relays of the final selector 34, which relays are in Fig. 4 functionally shown as comprising a separate unit 38. The intermediate unit 188, 190 performs the same comparison and switching function as does the comparison and switching branch of the described initial selector unit 22, and the relay circuits of this unit, which include relays 78, 80, 82, may be suitably employed for this intermediate selector unit. It is believed that the simple circuit changes and interconnecting circuits that are required to adapt the initial type of unit for use in the intermediate position are evident, and do not require detailed exposition and description herein.

In this connection it may be noted that the enabling relay 98 (Fig. 2) in the holding circuit 38 of final selector 34 provides one set of transfer contacts, such as contacts 2 and 3, for each selector unit whether it be of the initial, intermediate or final type. Therefore, as additional initial or intermediate selector units are added to a selecting system, a corresponding increase should be made in the number of transfer contacts that are operated by relay 98.

Although the invention has been described as being incorporated in a specific type of selecting system, it is to be understood that these described arrangements are illustrative of the application of the principles of the invention. Numerous other arrangements may be devised by those skilled in the art without departing from the spirit and scope of the invention.

What is claimed is:

1. In a communication system in which a number of receivers of the same message signal are employed and in which the desirability of the signal output of each receiver is indicated by a variable unidirectional voltage, a system for comparing said voltages and for interconnecting to a common message circuit the signal output of that receiver that produces the most desirable unidirectional voltage, said system comprising a selection device respective each pair of receivers for comparing the amplitudes of their unidirectional voltages, each such device comprising a relay differentially connected to the receivers and including means for biasing the relay in a selection condition, interconnecting means actuated by said selection devices and which during any interval is responsive only to the selection device which is then selecting the most desirable voltage for connecting the signal output of that message receiver associated with the most desirable voltage to said common message circuit, lock-up means responsive to a change in selection by a selection device for adjusting the biasing means in each of said devices to hold each device in its then selection condition during the interval said interconnecting means is switchng from one to another receiver output in response to such change in selection, and means for restoring said biasing means to their initial condition and said selection devices to an operating condition at the completion of each interconnecting switching operation.

2. In a signaling system employing a plurality of receivers of the same message wave and in which the relative desirability of each receiving channel is indicated by the magnitude of a unidirectional merit indicating voltage, a selection system for choosing the output of only the most desirable one of said receivers, which system comprises a polar relay differentially connected to a first pair of said receivers for comparing the magnitudes of the merit indicating signals of said receivers, a second polar relay differentially connected to a second pair of said receivers for comparing the merit indicating signals of said second pair of receivers, a switching relay respective each of said pairs of receivers and each of said comparison relays, a third switching relay, each of said first-mentioned switching relays being adapted to interconnect to said third switching relay the receiver output associated with the merit indicating signal chosen by its corresponding comparison relay, a third polar relay, each of said first two switching relays being connected to said third polar relay so as to apply in differential connection to said relay the merit indicating signal chosen by its respective comparison relay, said third switching relay being interconnected with and responsive to operation of said third polar relay for connecting to a utilization circuit the output of the receiver associated with the merit indicating signal that is selected by said third polar relay, relay holding means for locking each of said polar comparison relays in its then occupied position responsive to change by any polar comparison relay of its merit indicating signal selection, and means for separately actuating only the switching relay associated with said changed polar comparison relay and for releasing all of said comparison relays after said switching relay has been actuated.

3. In a signaling system employing a plurality of receivers of the same message wave and in which the relative desirability of each receiving channel is indicated by the magnitude of a merit indicating unidirectional voltage, a selection system for choosing the output of only the most desirable one of said receivers which system comprises, a first, second and third polar comparison relay, the windings of said first and second relays each being differentially connected to merit indicating signal branches of a respective first and second pair of said receivers, a first, second and third switching relay each being interconnected with and responsive to actuation of its respective first, second or third polar comparison relay, said first and second switching relays being respectively connected to the receiver outputs of said first and second pairs of receivers and to said third switching relay to interconnect said third switching relay to any one of said receiver outputs, said first and second switching relays being adapted to supply to said third polar comparison relay the merit indicating signal selected by its associated comparison relay, said third switching relay being responsive to said third polar comparison relay to connect to a utilization circuit one of the receiver output circuits supplied by said first and second switching relays, and relay holding means responsive to changes in the selection of each polar comparison relay for locking all comparison relays on their then present selection as soon as any comparison relay has changed its selection, and for causing the operation of only the switching relay that is actuated by the changed comparison relay.

4. A diversity receiver selection system including a plurality of receivers of the same message wave the signal receptive desirability of each of which is denoted by a merit indicating signal which comprises, differential relay means to compare the merit indicating signals of a first pair of receivers and to select the greater, differential relay means to compare the merit indicating signals of a second pair of receivers and to select the greater, differential relay means to compare the selected signals from said first and second pairs of receivers and to select the greater, switching means individual each of said comparison means to select the message signal output from the receiver producing the merit indicating signal chosen by its respective comparison means, normally open-circuited means included in each of said relay means for biasing each of said relay means, and means responsive to a change in the selection of any one of said comparing and selecting means for closing the circuit of such normally open-circuited means to bias said relay means in their then selection condition during the interval of operation of the switching means respective to the changed comparing and selecting means, and for restoring said bias means to normally open-circuited condition upon completion of such switching operation.

5. A diversity receiver selection system including a plurality of receivers of the same message wave the signal receptive desirability of each of which is denoted by a merit indicating signal, which comprises a plurality of initial selection units and a final selection unit, each of said initial units including relay comparison means to compare the merit indicating signals from a pair of message receivers, and relay switching means responsive to said relay comparison means to connect to said final unit the greater of the compared merit indicating signals and the message signal output of the receiver that produced said greater signal, each final selection unit comprising relay comparison means to compare the merit indicating signals selected by said initial units, relay switching means responsive to said final relay comparison means for connecting to a utilization circuit the selected message output corresponding to the merit indicating signal chosen by said final comparison relay means, and relay actuating means responsive to a change in the selection of any one of said relay comparison means for holding all of said relay comparison means on their then present selection and to actuate only that relay switching means which is responsive to the changed selection relay means.

6. In a communication system in which a number of receivers of the same message signal are employed and in which the desirability of the output of each receiver is indicated by a variable unidirectional voltage, a system for comparing said voltages and for interconnecting to a common message circuit the output of that receiver that produces the unidirectional voltage of greatest magnitude which comprises, a selection device respective each pair of receivers for comparing the amplitude of their respective unidirectional voltages, normally open-circuited means included in such a selection device which, upon closure of its circuit, locks said device in its then condition, interconnecting means actuated by said selection devices and which during any interval is responsive only to the selection device which is then selecting the unidirectional voltage of greatest amplitude for connecting the output of that message receiver associated with said greatest amplitude voltage to said common message circuit, relay means activated by a change in the selection of any one of said selective devices for closing the circuits of said normally open-circuited means thereby holding all of said selection devices in their then condition during the operating interval of said interconnecting means, and for reopening the circuits of said locking means and restoring said selection devices to a selective condition at the completion of an interconnecting switching operation.

7. In a diversity receiving system which includes a plurality of receivers of the same message wave the signal receptive desirability of each of which is denoted by a merit indicating voltage, relay means to compare the merit indicating voltages from each pair of receivers and to select the voltage of greatest amplitude in each compared pair, relay switching means respective each of said comparison means and responsive to the selection of said comparison means for connecting the output of a respective receiver of each pair of receivers to a selection unit, said selection unit comprising relay means to compare the selected merit indicating voltages from said first-mentioned comparison means, relay switching means responsive to said second-mentioned comparison means for connecting to a utilization circuit the receiver output corresponding to the merit indicating signal of greatest amplitude, and relay actuated means responsive to a change in the selection of any of said comparison means for maintaining their then present signal indicating selections and for actuating the relay switching means associated with the said changed comparison means, and relay actuated means responsive to said switching means for restoring said comparison means.

8. In a diversity receiving system in which a respective merit indicating voltage signal denotes the relative desirability of each of a plurality of receivers of the same message wave, first and second relay comparison means each of which is responsive to the difference between the merit indicating signals from the receivers of a first and second pair of receivers, each of said relay comparison means operating to select the merit indicating signal of greatest amplitude from each pair of receivers, a third relay comparison means responsive to the difference between said selected merit indicating signals for selecting the signal of greatest amplitude, relay holding means responsive to a change in the selection of any one of said comparison means for holding each of said comparison means in its then present position, relay switching means controlled by a respective one of said comparison means for selecting the output of the most desirable of said receivers, and relay actuating means for actuating said switching means after said comparison means are held in their then present condition and for releasing said comparison means from this condition after said switching means has changed its receiver selection.

9. In a diversity receiving system in which a respective merit indicating voltage signal denotes the relative desirability of each of a plurality of receivers of the same message wave, a first and a second relay comparison means each of which is responsive to the difference in magnitude between the merit indicating signals from the respective receivers of a first and second pair of said receivers, each of said comparison means selecting the merit indicating signal of greatest amplitude from its associated pair of receivers, a third relay comparison means responsive to the difference in the amplitude between the selected merit indicating signals for selecting the merit indicating signal of greatest amplitude, relay holding means responsive to a change in selection of any one of said comparison means for preventing further operation of any of said comparison means, relay switching means controlled by a respective one of said relay comparison means for selecting the output of the receiver that produces the merit indicating signal selected by its respective comparison means, and relay actuating means responsive to said relay holding means to actuate said switching means after said comparison means are immobilized, and for releasing said comparison means from this immobilized condition after said switching means has changed its selection.

10. In a diversity receiving system in which the same message wave may be received by a plurality of receivers, the relative desirability of the message output of each of which is indicated by a respective unidirectional voltage, and in which each of said receivers is provided with a normal and an emergency power supply, a receiver selection and power alarm system which comprises, a polarity sensitive relay comparison means respective each pair of said receivers, the merit indicating voltages from said paired receivers being supplied in opposition to the windings of said relay, a relay actuating and switching means responsive to said relay comparison means for selecting the receiver output associated with the merit indicating signal that is adjudged to be the better of the compared two signals, a polarity reversing relay means respective each receiver and actuated by the connection of the emergency power supply to said receiver for reversing the polarity of the merit indicating signal provided by said receiver, polarity sensitive relay means respective each polarity reversing means and responsive to the operation of said means for reversing the connections to the windings of said polarity sensitive relay comparison means each time said polarity reversing relay means is actuated, and alarm signals responsive to the operation of said last-mentioned relay means for indicating which power supply is actuating the respective message receiver.

11. In a diversity receiving system in which a plurality of receivers of the same message wave are equipped with a normal and an emergency power supply system, and in which the relative desirability of each receiver is indicated by the amplitude of a unidirectional merit indicating signal, polarity sensitive relay means operative in response to the polarity and difference in amplitudes of said signals for comparing said signals and for selecting the most desirable of said receivers in accordance with the difference between said signals, relay actuated means at each receiver for reversing the polarity of said signals from said respective receiver when said receiver is operated from its emergency power supply, and relay actuated means respective each of said receivers for again reversing the polarity of said reversed merit indicating unidirectional signal supplied to the respective polarity sensitive relay comparison and selecting means when said receiver is operated from its emergency power supply, and for indicating by alarm signals the emergency power supply condition at said respective receiver.

12. A signaling system comprising a plurality of message signal paths in which the desirability of the signal content of a path is evidenced by a respective relative merit signal, a common message signal channel for successive interconnection with one only of said paths during the interval in which the respective path possesses the better relative merit signal, and means for comparing the relative merit signals of said paths and for successively interconnecting with said channel that one of said paths which during successive intervals evidences the better relative merit signal, said means comprising merit signal comparison and path selecting circuits for selecting between pairs of paths and including a terminal merit signal comparison and path selecting circuit responsive during any interval to two only of the merit signals of said plurality of paths, normally open-circuited means included in each such circuit which upon closure locks the comparison circuits in their then condition to preclude further operation of the comparison circuits, means to close the circuits of said normally open-circuited means if merit signal comparison between any two paths indicates that a switch should be made from one said path to another, and means to restore such normally open-circuited means to normal condition and reestablish the normal operating condition of said comparison and selecting circuits subsequent to completion of such switching operation.

ROBERT O. SOFFEL.

REFERENCES CITED

The following references are of record in the file of this patent:

UNITED STATES PATENTS

| Number | Name | Date |
|---|---|---|
| 1,940,097 | Ohl | Dec. 19, 1933 |
| 2,004,126 | Moore | June 11, 1935 |
| 2,282,526 | Moore | May 12, 1942 |